(12) United States Patent
Uramichi

(10) Patent No.: US 7,066,541 B2
(45) Date of Patent: Jun. 27, 2006

(54) SEAT RECLINING MECHANISMS

(75) Inventor: Hideki Uramichi, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/923,402

(22) Filed: Aug. 20, 2004

(65) Prior Publication Data

US 2005/0073185 A1    Apr. 7, 2005

(30) Foreign Application Priority Data

Aug. 22, 2003 (JP) .............................. 2003-298869
Apr. 1, 2004 (JP) .............................. 2004-108943
Aug. 9, 2004 (JP) .............................. 2004-232236

(51) Int. Cl.
    *B60N 2/48* (2006.01)
(52) U.S. Cl. ..................................................... 297/367
(58) Field of Classification Search ................ 297/367, 297/216.13, 366, 216.1, 369
    See application file for complete search history.

(56) References Cited

U.S. PATENT DOCUMENTS

| 4,143,905 | A | | 3/1979 | Hensel et al. |
| 5,161,856 | A | | 11/1992 | Nishino |
| 5,681,086 | A | | 10/1997 | Baloche |
| 6,880,887 | B1 | * | 4/2005 | Hoshihara et al. .......... 297/367 |
| 2002/0041119 | A1 | * | 4/2002 | Kojima et al. .............. 297/367 |
| 2002/0096925 | A1 | * | 7/2002 | Uramichi .................... 297/367 |
| 2002/0171280 | A1 | * | 11/2002 | Okazaki et al. ............. 297/367 |

FOREIGN PATENT DOCUMENTS

DE        102 53 054 A1     6/2004
WO    WO 2004/043733 A1     3/2004

OTHER PUBLICATIONS

US 6,648,413, 11/2003, Uramichi (withdrawn)

* cited by examiner

*Primary Examiner*—Milton Nelson, Jr.
(74) *Attorney, Agent, or Firm*—Patterson, Thuente, Skaar & Christensen, P.A.

(57) ABSTRACT

A seat reclining mechanism for a vehicle seat may includes a plurality of slide pawls each having an outward toothed portion and a side surface, a ratchet having an inward circular toothed portion, and a holder having a plurality of guide portions each of which is formed with a torque receiving portion. The seat reclining mechanism further includes a cam member pushing the slide pawls toward the inward toothed portion of the ratchet, and at least one contact projection formed in the torque receiving wall of the torque receiving portion and projecting toward the slide pawl side surface. The contact projection is arranged and constructed such that it is deformed to eliminate variations among clearances formed between the slide pawls and the torque receiving portions when a torque is exerted between the ratchet and the holder, so that the torque is evenly distributed among the slide pawls.

6 Claims, 13 Drawing Sheets

SEAT RECLINING MECHANISMS

BACKGROUND OF THE INVENTION

1. Field of the Invention Deferent

The present invention relates to seat reclining mechanisms for adjusting a tilt angle of a seat back of a seat (e.g., a vehicle seat). More particularly, the present invention relates to seat reclining mechanisms that have a high load resistance when the seat back is tilted.

2. Description of the Related Art

Typically, a vehicle seat comprises a seat back and a seat cushion. The seat back and the seat cushion are rotatably interconnected via a seat reclining mechanism for adjusting a tilt angle of the seat back. Such a seat reclining mechanism is taught, for example, by Japanese Laid-Open Patent Publication Number 2002-119349.

The known seat reclining mechanism includes a pair of opposing disk-shaped housings, i.e., a first or stationary housing and a second or rotational housing. The first housing is affixed to the vehicle seat cushion. The second housing is affixed to the vehicle seat back. The first and second housings are circumferentially connected by an annular fastener or clip ring along peripheral edges thereof, so that the second housing can move or rotate around a rotational shaft relative to the first housing.

The seat reclining mechanism further includes a locking means that can prevent the second housing from rotating relative to the first housing, so as to lock the seat reclining mechanism. The locking means essentially consists of a cam member and two pairs of slide pawls that are received within the housings. The cam member is secured to or integrally formed with the rotational shaft, so as to rotate with the rotational shaft. The slide pawls are slidably received between guide members that are formed within the first housing, so as to radially move on the first housing. As will be recognized, the slide pawls are appropriately shaped such that "desired clearances" are produced between the slide pawls and the guide members. In addition, each of the slide pawls is provided with a convex toothed portion.

When the rotational shaft is rotated to a locking position, the pawls are radially moved outward by the cam member, so that the respective convex toothed portions of the pawls engage a concave toothed portion that is circumferentially formed over an inner circular surface of the second housing peripheral edge. In this state, the second housing (i.e., ratchet) is prevented from rotating relative to the first housing, so that the seat reclining mechanism is locked. As a result, the seat back is locked in position relative to the seat cushion.

Often times, when the seat back is locked, a substantial force can be unexpectedly applied to the seat reclining mechanism in a direction to forwardly tilt the seat back relative to the seat cushion. The force may act as a rotational moment or torque that may force the second housing to rotate relative to the first housing. As a result, the slide pawls may be forced against the corresponding guide members. That is, such a force may be exerted on and received by the four slide pawls. However, if the clearances formed between the slide pawls and the guide members are not equal to each other (i.e., if the clearances have manufacturing variations), such a force is concentrated on only a specific slide pawl that corresponds to the smallest clearance. That is, the force is not evenly received by the four slide pawls. Consequently, the seat reclining mechanism may not achieve the best performance. Many approaches have been made in order to reduce the variations among the clearances. However, all of the approaches have resulted in an increased manufacturing cost.

SUMMARY OF THE INVENTION

It is, accordingly, one object of the present teachings to provide improved seat reclining mechanisms, in particular, to provide seat reclining mechanisms that can achieve good performance even if clearances formed between slide pawls and guide members have substantial manufacturing variations.

For example, in one aspect of the present teachings, a seat reclining mechanism for a vehicle seat may include a plurality of slide pawls each having an outward toothed portion and a side surface, a ratchet having an inward circular toothed portion, and a holder having a plurality of guide portions, each of which is formed with a torque receiving portion. The guide portions slidably receive the slide pawls so that the slide pawls can be moved toward and away from the inward toothed portion of the ratchet. The torque receiving portion has a torque receiving wall that is opposed to the side surface of the slide pawls. The seat reclining mechanism further includes a cam member pushing the slide pawls toward the inward toothed portion of the ratchet, and at least one contact projection formed in the torque receiving wall of the torque receiving portion and projecting toward the slide pawl side surface. The contact projection is arranged and constructed such that it is deformed to eliminate variations among clearances formed between the slide pawls and the torque receiving portions when a torque is exerted between the ratchet and the holder, so that the ratchet and the holder rotate relative to each other by the amount corresponding to the deformation of the contact projection.

According to the seat reclining mechanism thus constructed, when a force is applied thereto such that a torque is exerted between the ratchet and the holder, the variations among the clearances may preferably be eliminated so that all of the slide pawls contact the corresponding torque receiving portions. As a result, such a torque may easily be distributed to the torque receiving walls of all of the torque receiving portions. Therefore, the seat reclining mechanism may achieve an increased performance.

Optionally, the torque receiving portion may have a removed portion that is formed by thinning or removing an outermost side of the torque receiving portion.

In this case, the contact projection is more easily deformed to eliminate the variations among the clearances due to the removed portion when the torque is exerted between the ratchet and the holder. Further, an ability to withstand the exerted torque may not be reduced. That is, the variations among the clearances may preferably be eliminated without reducing the ability to withstand the exerted torque.

Typically, the torque receiving portion may have an arcuate wall so that an arcuate guide groove is defined between the arcuate wall and the peripheral edge of the holder. The removed portion may preferably be formed such that the arcuate guide groove is broadened toward a rotational axis of the ratchet at both ends. Therefore, the removed portion does not reduce the function of the guide wall so that the seat reclining mechanism can be smoothly locked or unlocked without producing rattling movement.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

Detailed representative embodiments of the present teachings are shown in FIG. 1 to FIG. 15.

FIRST DETAILED REPRESENTATIVE EMBODIMENT

A first detailed representative embodiment of the present teachings is shown in FIGS. 1 to 10.

Figure 1:
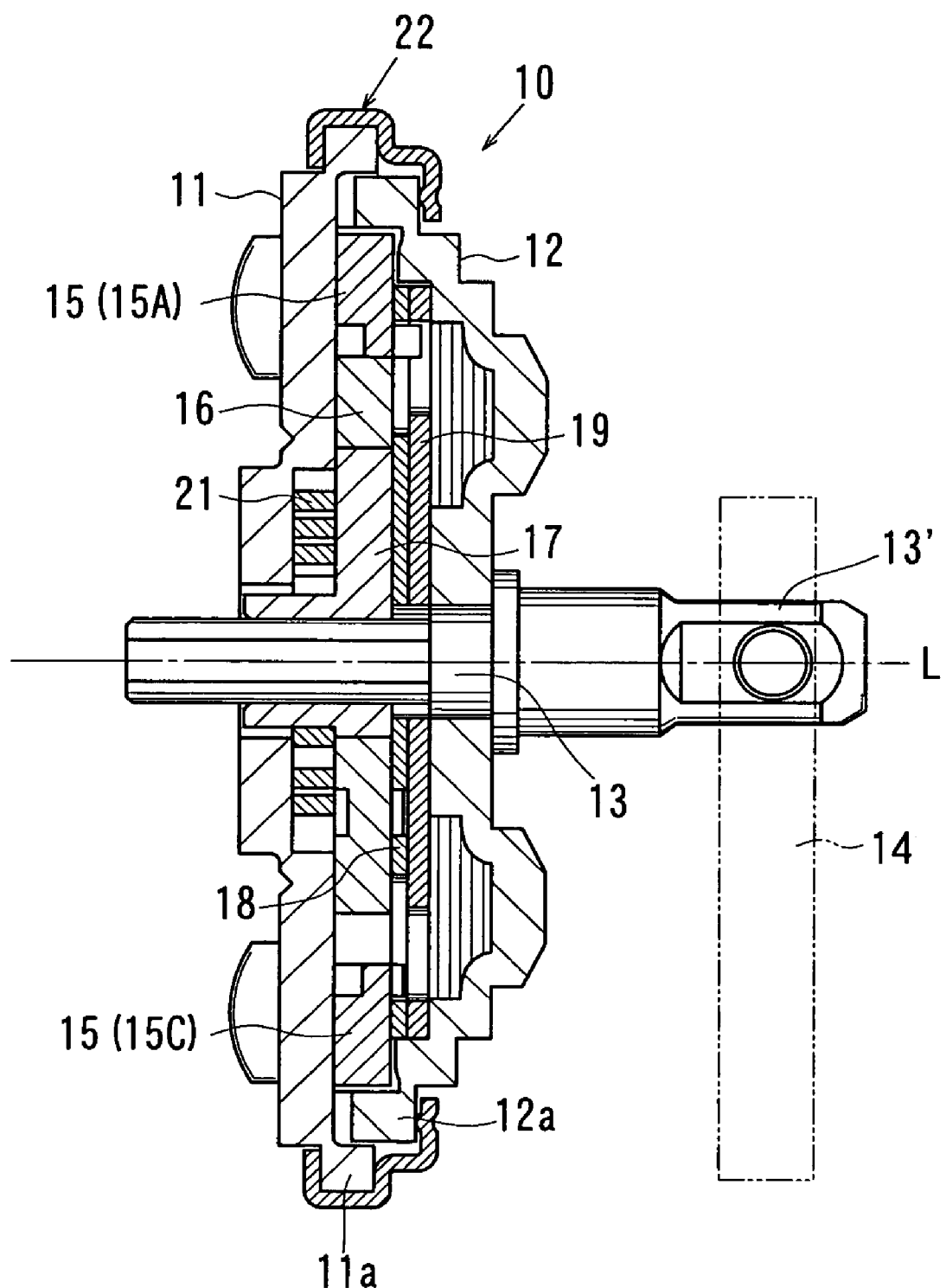
FIG. 1 is a vertical, cross-sectional view of a seat reclining mechanism according to a first embodiment of the present teachings (a cross-sectional view taken along line I—I in FIG. 3)
Figure 2:
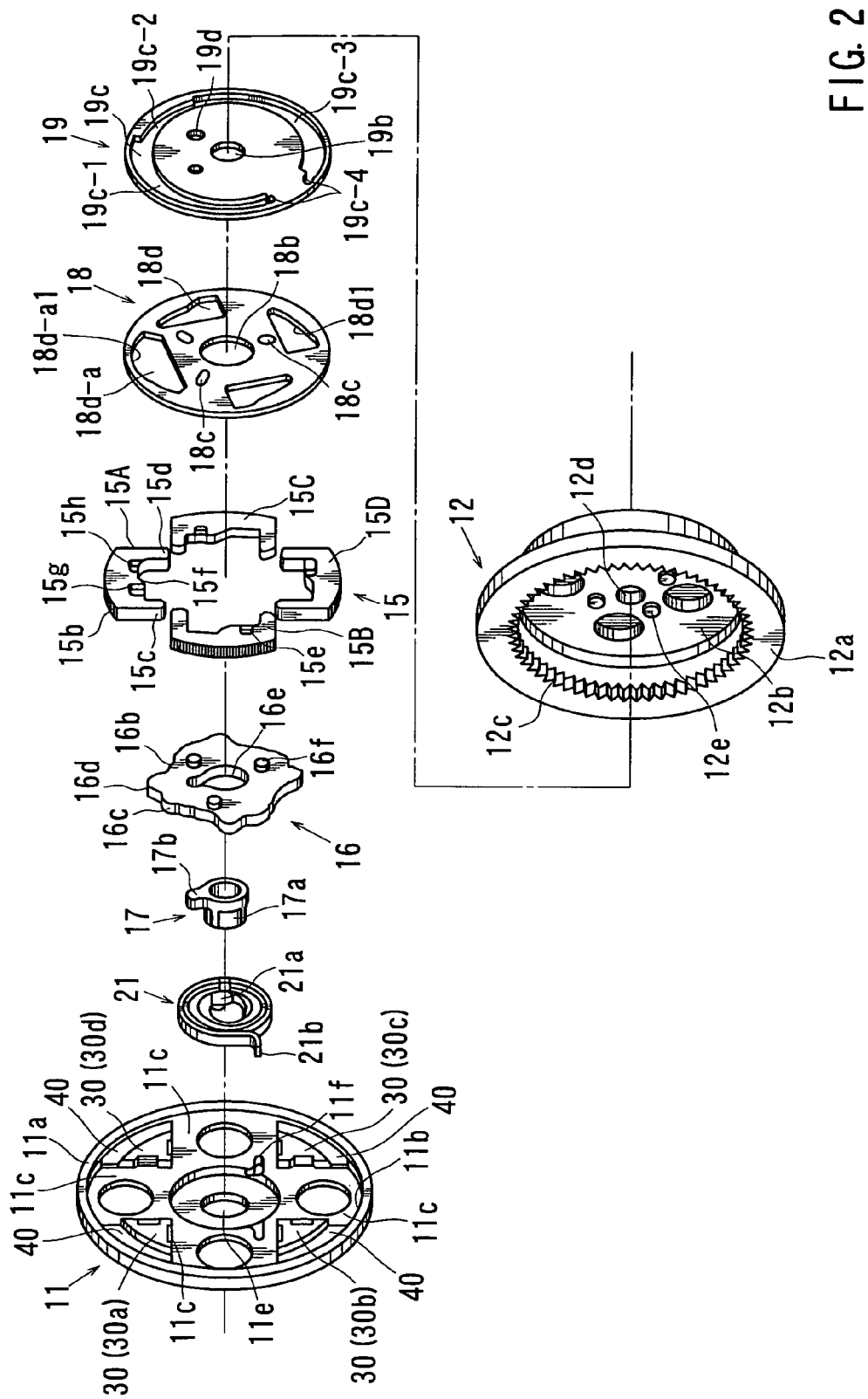
FIG. 2 is an exploded perspective view of the seat reclining mechanism.
Figure 3:
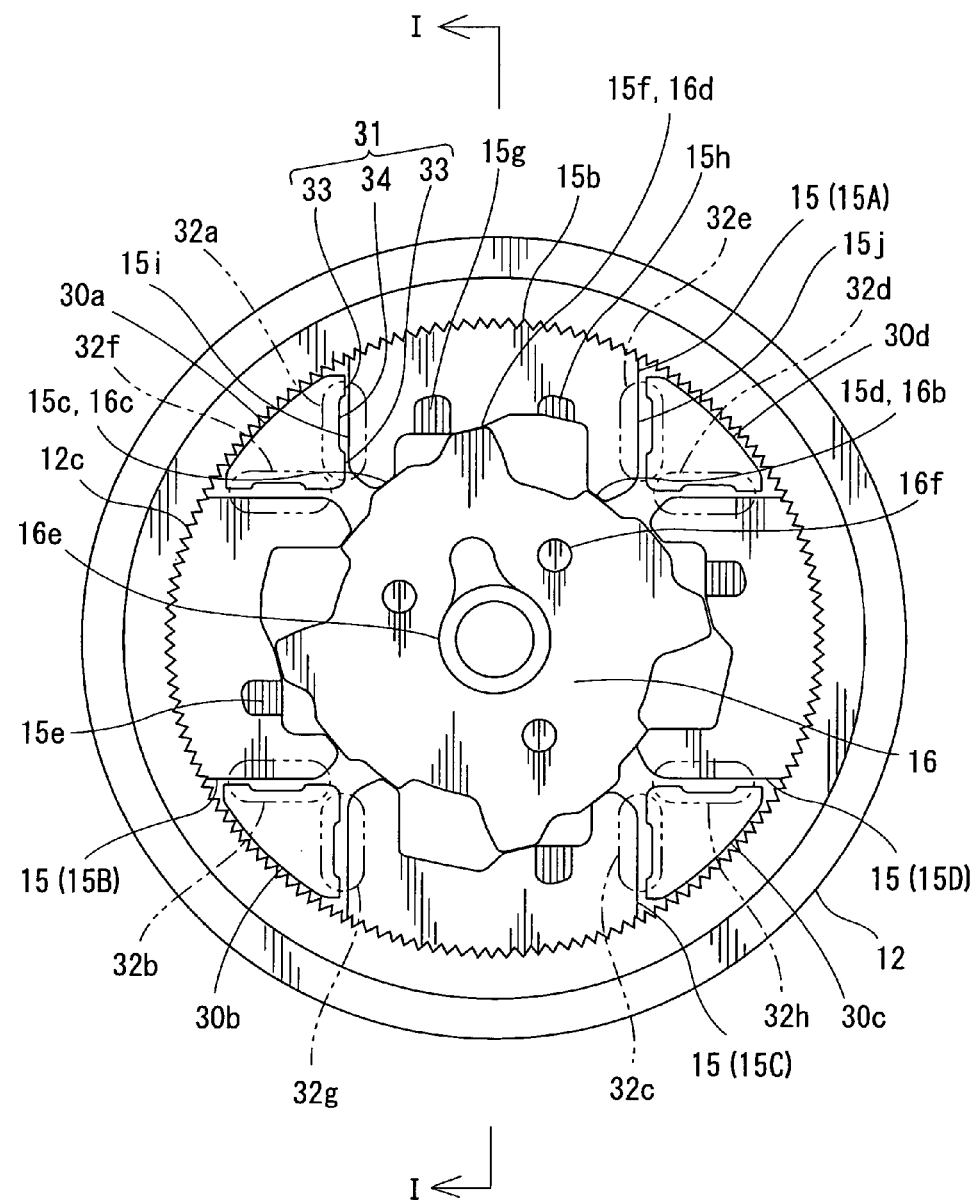
FIG. 3 is a plan view of the seat reclining mechanism, which illustrates a locking position of a rotational shaft of the seat reclining mechanism, in which some components are omitted.
Figure 6:
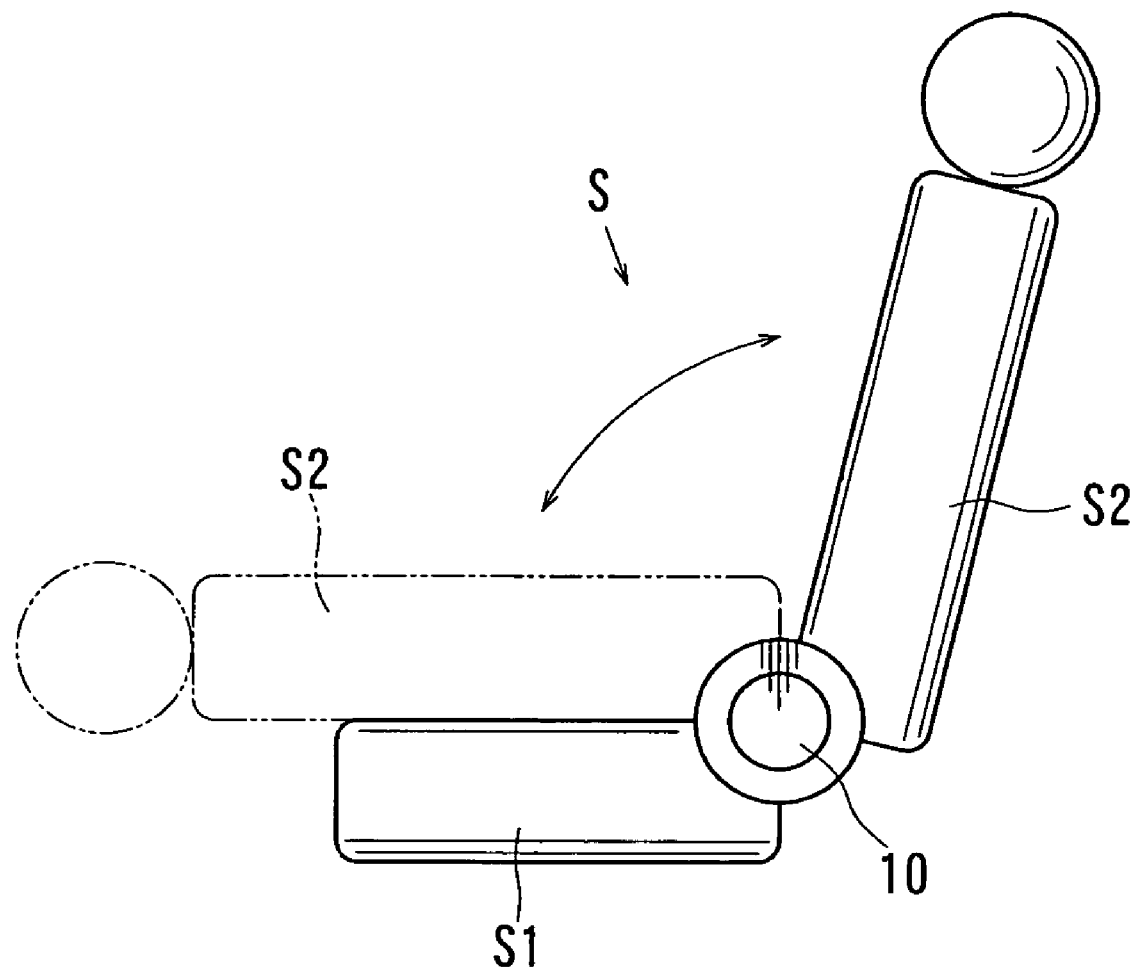
FIG. 6 is a schematic illustration of a vehicle seat.

As shown in FIG. 6, a representative seat reclining mechanism 10 for adjusting a tilt angle of a seat back S2 of a vehicle seat S is designed to be disposed on one side of the vehicle seat S. As shown in FIGS. 1 to 3, the seat reclining mechanism 10 includes a pair of opposing dish-shaped housings, i.e., a first or stationary housing (i.e., holder) 11 and a second or rotational housing 12. The first housing 11 is affixed to a vehicle seat cushion S1 (FIG. 6). The second housing 12 is affixed to the vehicle seat back S2 (FIG. 6). The first and second housings 11 and 12 are circumferentially connected by an annular fastener or clip ring 22 along oppositely projected peripheral edges 11a and 12a thereof, so that the second housing 12 can move or rotate relative to the first housing 11 around a rotational axis L. Further, the rotational axis L corresponds to a common centerline of the first and second housings 11 and 12.

The seat reclining mechanism 10 also includes a rotational rod or shaft 13 that extends along the rotational axis L through the seat cushion S1 and the seat back S2 as well as the first and second housings 11 and 12. The rotational shaft 13 includes an extended portion (manipulating portion) 13', which is typically connected to a seat operation handle or lever 14.

The seat reclining mechanism 10 further includes a locking means or rotation controlling means that can prevent the second housing 12 from rotating relative to the first housing 11, so as to lock the seat reclining mechanism 10. As best shown in FIG. 2, the locking means preferably consists of four slide pawls (i.e., locking members) 15, a rotary cam (i.e., cam member) 16, an operation arm 17, an active plate 18, an unlocking plate 19 and a biasing (spiral) spring 21 that are received within the housings 11 and 12. As shown in FIGS. 1 and 3, the operation arm 17 is secured to the rotational shaft 13, so as to rotate with the rotational shaft 13.

Figure 7:
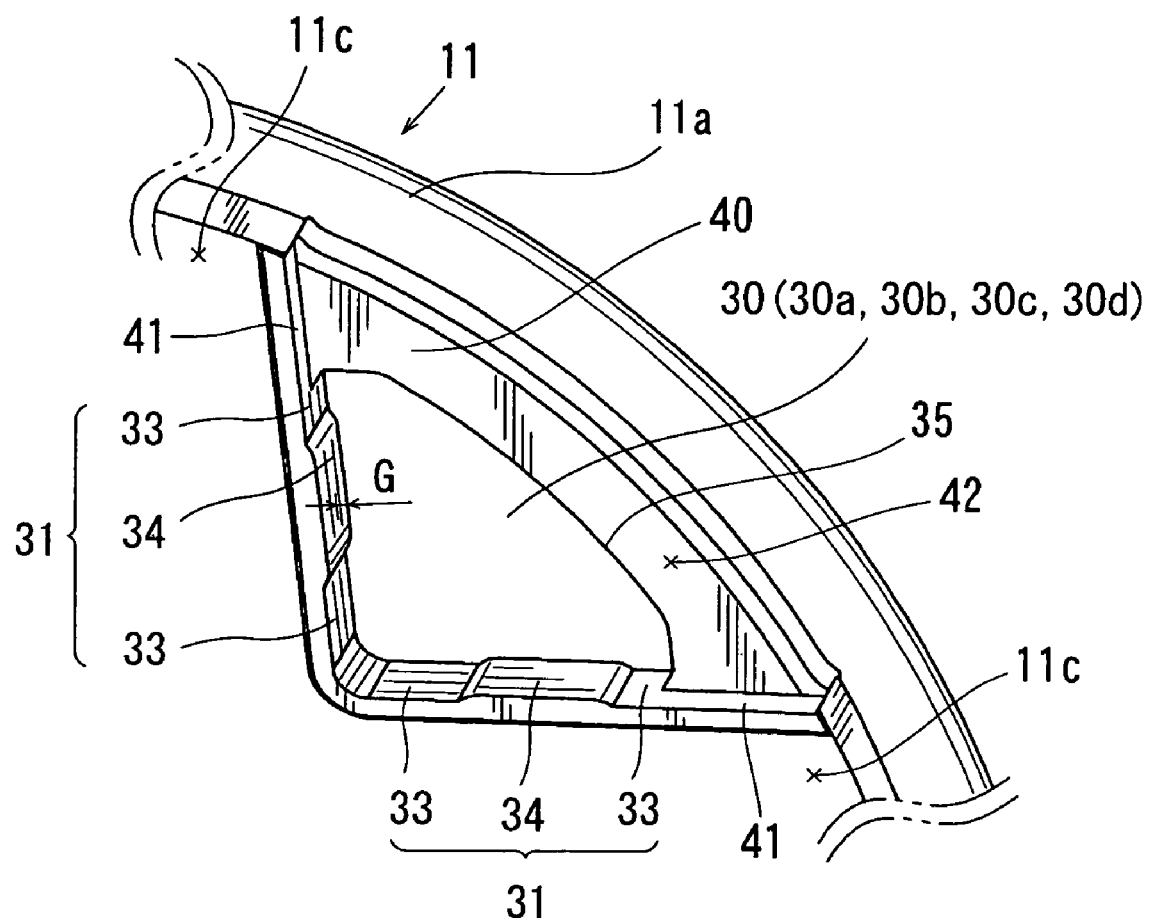
FIG. 7 is an enlarged perspective view of a guide portion formed in a first housing.
Figure 12:
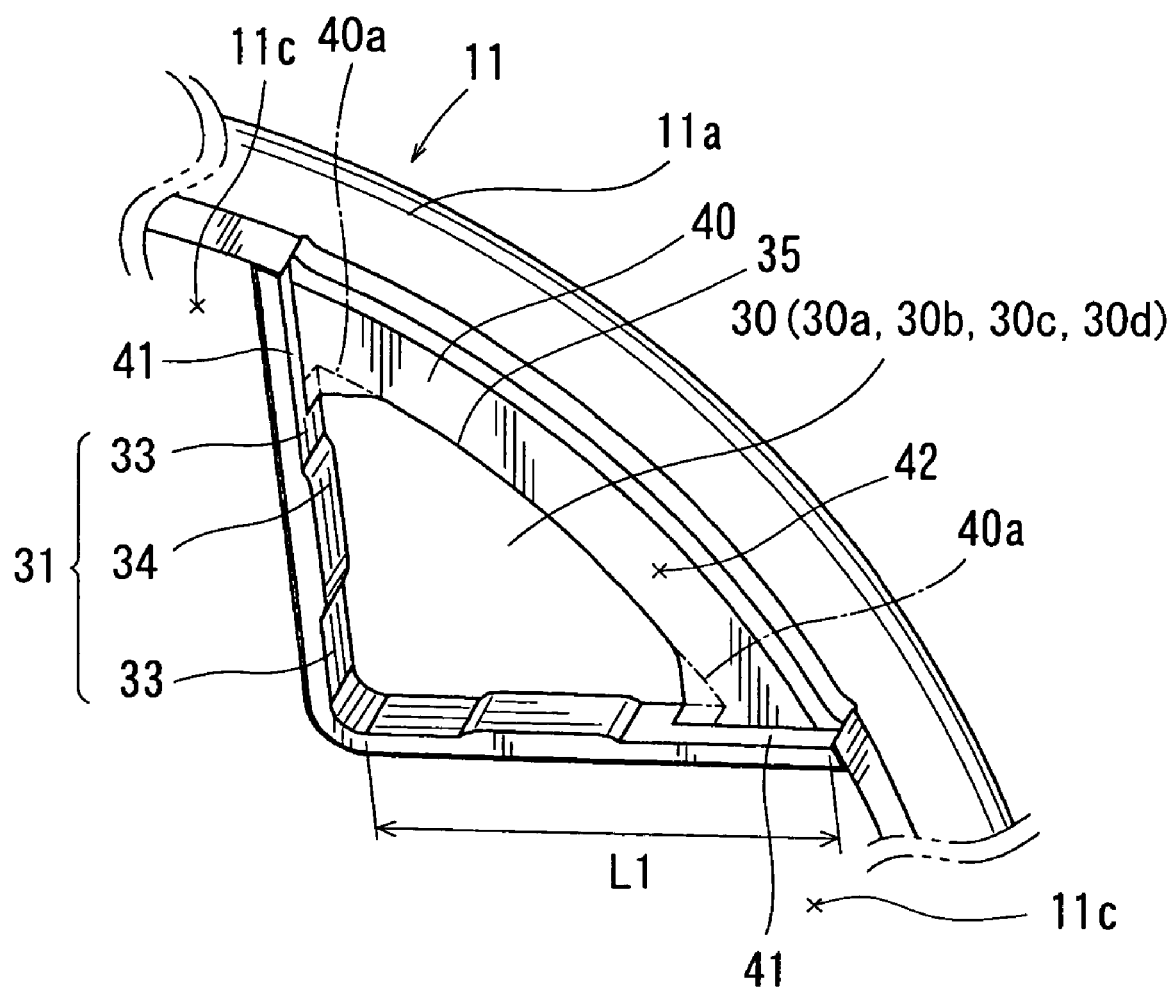
FIG. 12 is a view similar to FIG. 7, which illustrates a seat reclining mechanism according to a third embodiment of the present teachings, in which a modified guide portion having removed portions is used.

As shown in FIG. 2, the first housing 11 has a circular recess 11b, which is formed with two pairs of guide blocks (i.e., guide portions) 40. Each of the guide blocks 40 has a pair of orthogonal guide walls 41 (FIG. 7). Further, each of the guide blocks 40 is formed with an opposite triangular thickened portion or torque receiving portion 30 (30a, 30b, 30c, 30d). Each of the torque receiving portions 30 has a pair of orthogonal torque receiving walls 31, which may preferably be coplanar with the guide walls 41. Also, each of the torque receiving portions 30 has an arcuate wall 35 so that an arcuate guide groove 42 is defined between the arcuate wall 35 and the peripheral edge 11a of the first housing 11 (FIG. 12). As will be recognized, the arcuate guide groove 42 may preferably receive the peripheral edge 12a of the second housing 12 when the first and second housings 11 and 12 are coupled. The guide blocks 40 are positioned at equal intervals along the peripheral edge 11a, so that four guide grooves 11c are defined between the guide walls 41. As will be apparent, the guide grooves 11c may intersect crosswise and radially extend on the first housing 11. Also, the guide grooves 11c may be positioned more deeply in a direction of the rotational axis L than the arcuate guide groove 42. In addition, the first housing 11 is formed with a central circular bore 11e, which rotatably receives the rotational shaft 13. Furthermore, the first housing 11 has an inner annular groove 11f that is formed around the central bore 11e.

As shown in FIGS. 2 and 3, the second housing 12 has a shouldered circular recess 12b, which includes a circular concave toothed portion 12c that is circumferentially formed along an inner surface of the peripheral edge 12a. In addition, the second housing (i.e., ratchet) 12 is formed with a central circular bore 12d, which is aligned with the central bore 11e and rotatably receives the rotational shaft 13. Moreover, the second housing 12 is formed with four inner engagement projections 12e, which are appropriately arranged around the central bore 12d.

As shown in FIGS. 2 and 3, all of the slide pawls 15 have substantially the same shape and construction. However, one of the slide pawls 15 (which will be referred to as a special slide pawl 15A) has a special construction different from the other three slide pawls 15 (which will be referred to as normal slide pawls 15B, 15C and 15D), so as to have a special function (which will be hereinafter described). The slide pawls 15 are closely slidably received within the guide grooves 11c of the first housing 11, so as to radially move on the first housing 11. As will be recognized, because the slide pawls 15 are received in the guide grooves 11c, the slide pawls 15 may preferably be prevented from rotating relative to the first housing 11. Also, the slide pawls 15 may preferably move in the guide grooves 11c because the guide grooves 11c are positioned more deeply than the arcuate guide groove 42.

As best shown in FIGS. 5(A) and 5(B), each of the slide pawls 15 has an outwardly curved outer surface and a specially shaped inner surface. The curved outer surface of each pawl 15 is provided with a corresponding convex toothed portion 15b for releasably engaging the concave toothed portion 12c of the second housing 12. Also, the inner surface of each slide pawl 15 is provided with a pair of leg portions or cam contacts (first and second) 15c and 15d that extend in parallel along each of the guide grooves 11c. In addition, the inner surface of each pawl 15 is provided with an additional or central cam contact (third) 15f.

Each of the normal slide pawls 15 (15B, 15C and 15D) has a substantially square cam projection 15e that projects toward the second housing 12. The cam projection 15e is disposed along the inner surface of each of the normal slide pawls 15B, 15C and 15D. The special slide pawl 15A also has a substantially square cam projection 15g similar to the cam projection 15e of each of the normal slide pawls 15B, 15C and 15D. However, the cam projection 15g is different from the cam projection 15e in that the cam projection 15g is longer or higher than the cam projection 15e. The special slide pawl 15A also has an additional cam projection 15h that projects in parallel with the cam projection 15g. The additional cam projection 15h also is disposed along the inner surface of the slide pawl 15A and has substantially the same length or height as the longer cam projection 15h. The cam projection 15g of the special slide pawl 15A may perform the same function as the cam projection 15e as well as an additional function (which will be hereinafter described).

As shown in FIGS. 2 and 3, the rotary cam 16 is a specially contoured plate-shaped member. The rotary cam 16 is received in a space defined by the inner surfaces of the slide pawls 15, so as to be rotatable around the rotational axis L over a desired angle. The rotary cam 16 has four sets of three cam portions (first to third), 16c, 16b, and 16d, that are formed in a circumferential end surface thereof. The first cam portions 16c of the respective sets are positioned at equal intervals along the circumferential end surface. Similarly, the second and third cam portions 16b and 16d of the respective sets also are positioned at equal intervals along the circumferential end surface. As best shown in FIG. 3, the first to third cam portions 16c, 16b, and 16d, of each set are respectively arranged and constructed to contact the first to third cam contacts 15c, 15d, and 15f, of each pawl 15, so that the slide pawls 15 can be moved outwardly along the guide grooves 11c when the rotary cam 16 is rotated to a locking position (FIG. 3). That is, the rotary cam 16 may function as a cam mechanism for outwardly moving the slide pawls 15 when it is rotated to the locking position.

In addition, the rotary cam 16 is formed with a noncircular central bore 16e. Further, the rotary cam 16 has three engagement projections 16f that are positioned around the central bore 16e at desired intervals and project toward the second housing 12.

The operation arm 17 comprises a square tubular connecting portion 17a and a noncircular arm portion 17b. The arm portion 17b is integrally formed with the connecting portion 17a and has an outer profile that substantially corresponds to an inner profile of the rotary cam central bore 16e. As shown in FIG. 3, the connecting portion 17a has a through bore that corresponds to an outer profile of the rotational shaft 13. The connecting portion 17a is journaled on the rotational shaft 13, so that the operation arm 17 (the arm portion 17b) can rotate with the rotational shaft 13. As will be appreciated, the operation arm 17 is appropriately positioned on the shaft 13, so that the arm portion 17b unrotatably engages the rotary cam central bore 16e.

As shown in FIG. 2, the active plate 18 is a substantially circular plate-shaped member and is positioned adjacent to the slide pawls 15. The active plate 18 is formed with a circular central bore 18b, which is aligned with the central bores 11e and 12d, of the housings 11 and 12, and rotatably receives the rotational shaft 13. Also, the active plate 18 has three small engagement apertures 18c, which are positioned around the central bore 18b at desired intervals. As will be appreciated, the engagement apertures 18c respectively receive the engagement projections 16f of the rotary cam 16, so that the active plate 18 can be rotated with the rotary cam 16 as a unit. In addition, the active plate 18 further includes three window-like normal cam slots 18d and a window-like special cam slot 18d-a that are formed along a periphery thereof at equal intervals. Each of the normal cam slots 18d has an arcuate normal cam contact surface 18d1. Similarly, the special cam slot 18d-a has an arcuate special cam contact surface 18d-a1, which is partially identical with the normal cam surface 18d1. As will be recognized, the normal cam grooves 18d respectively receives the cam projections 15e of the normal slide pawls 15B, 15C and 15D. Also, the special cam groove 18d-a receives both of the cam projections 15g and 15h of the special slide pawl 15A. As a result, the active plate 18 may function as a cam mechanism for inwardly moving the slide pawls 15 when the rotary cam 16 is rotated clockwise in FIG. 3.

As shown in FIG. 2, the unlocking plate 19 is a substantially circular plate-shaped member and is positioned adjacent to the active plate 18. The unlocking plate 19 is formed with a circular central bore 19b, which is aligned with the active plate central bore 18b and rotatably receives the rotational shaft 13. Also, the unlocking plate 19 has two small engagement apertures 19d, which are positioned around the central bore 19b. In addition, the unlocking plate 19 further includes a substantially annular or horseshoe-shaped cam slot 19c extending along a periphery thereof. The cam slot 19c includes a pair of (first and second) symmetrical wide sections 19c-1 and 19c-3, and a narrow mid-section 19c-2. Each of the first and second wide sections 19c-1 and 19c-3 is formed with an end engagement portion 19c-4. As will be recognized, the engagement apertures 19d and the end engagement portions 19c-4 respectively engage the inner engagement projections 12e of the second housing 12, so that the unlocking plate 19 can be rotated with the second housing 12 as a unit.

The first wide section 19c-1 has substantially the same shape and size as the second wide section 19c-3. That is, the first wide section 19c-1 includes a cam surface that has the same radius of curvature as that of the third wide section 19c-3. However, the mid-section 19c-2 includes a cam surface that has a smaller radius of curvature than that of the wide section 19c-1 or 19c-3. The cam slot 19c thus shaped receives the cam projections 15g and 15h of the special slide pawl 15A. As will be recognized, the cam slot 19c does not receives the cam projections 15e of the normal slide pawls 15B, 15C and 15D, because the cam projections 15e terminate in the active plate cam slots 18d and do not extend to the unlocking plate 19. As a result, the unlocking plate 19 may function as a cam mechanism for inwardly moving only the special slide pawl 15A.

It should be noted that the unlocking plate 19 is preferably positioned such that the cam projections 15g and 15h of the slide pawl 15A are received in the first wide section 19c-1 of the cam slot 19c, so as to contact the cam surface of the first wide section 19c-1 when the rotary cam 16 is in the locking position (FIG. 3). In addition, the unlocking plate 19 also is preferably positioned such that the cam projection 15h of the slide pawl 15A is disposed adjacent to the beginning of the mid-section 19c-2 of the cam slot 19c.

The biasing (spiral) spring 21 is disposed within the annular groove 11f of the first housing 11. The spiral spring 21 includes an inner end portion 21a that is coiled into a rectangular shape and an outer end portion 21b that is simply outwardly folded. The inner end portion 21a unrotatably receives the square connecting portion 17a of the operation arm 17. The outer end portion 21b is appropriately secured in the first housing annular groove 11f, so that the biasing spring 21 is not rotated therein. As will be recognized, the spiral spring 21 thus arranged and constructed may preferably urge (bias) the operation arm 17 (and the rotational shaft 13) in a desired rotational direction (i.e., counterclockwise in FIG. 3), so that the rotational shaft 13 can be normally retained in a locking position (FIG. 3).

Figure 4:
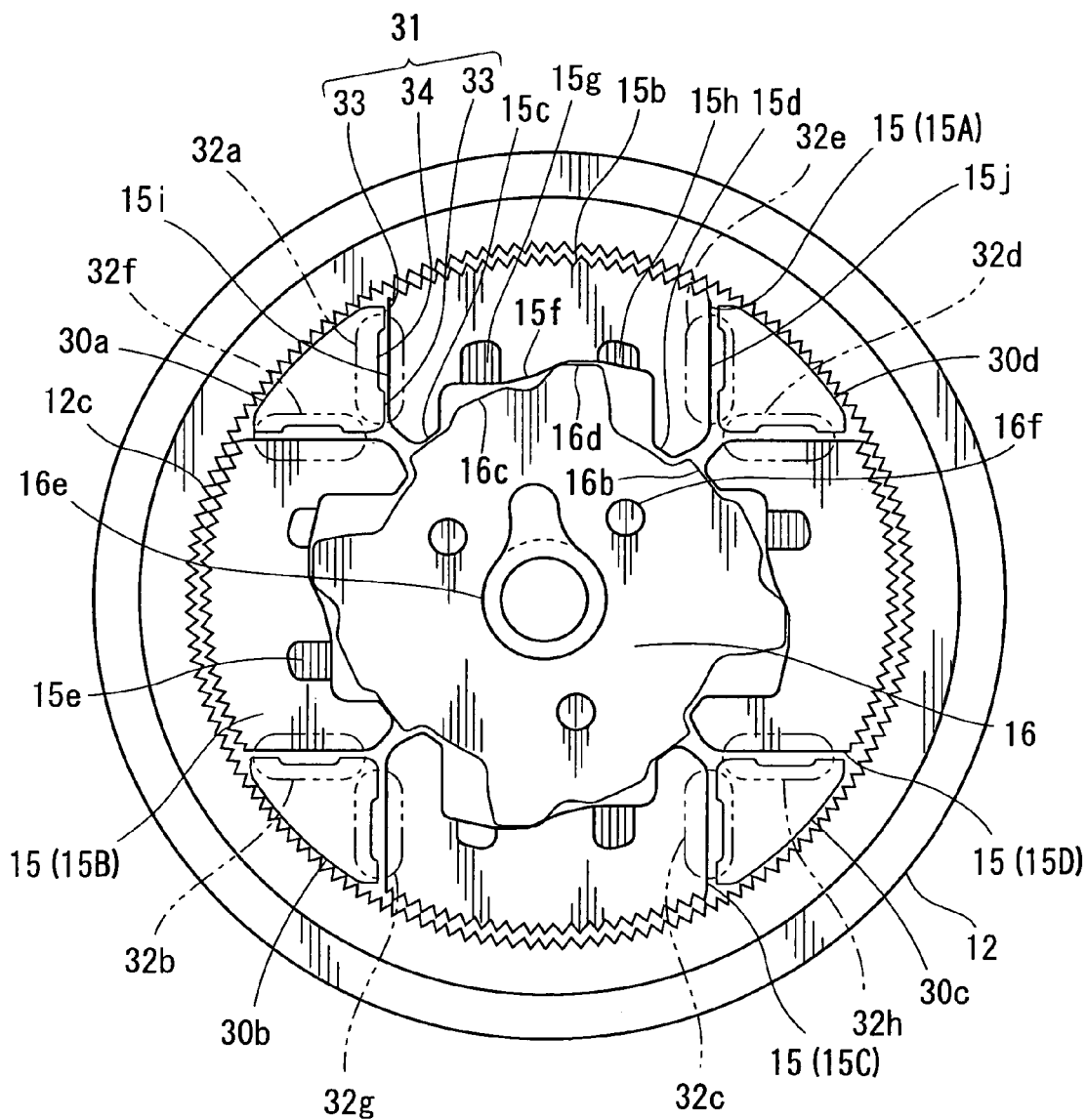
FIG. 4 is a plan view of the seat reclining mechanism, which illustrates an unlocking position of the rotational shaft of the seat reclining mechanism, in which some components are omitted.
Figure 5:
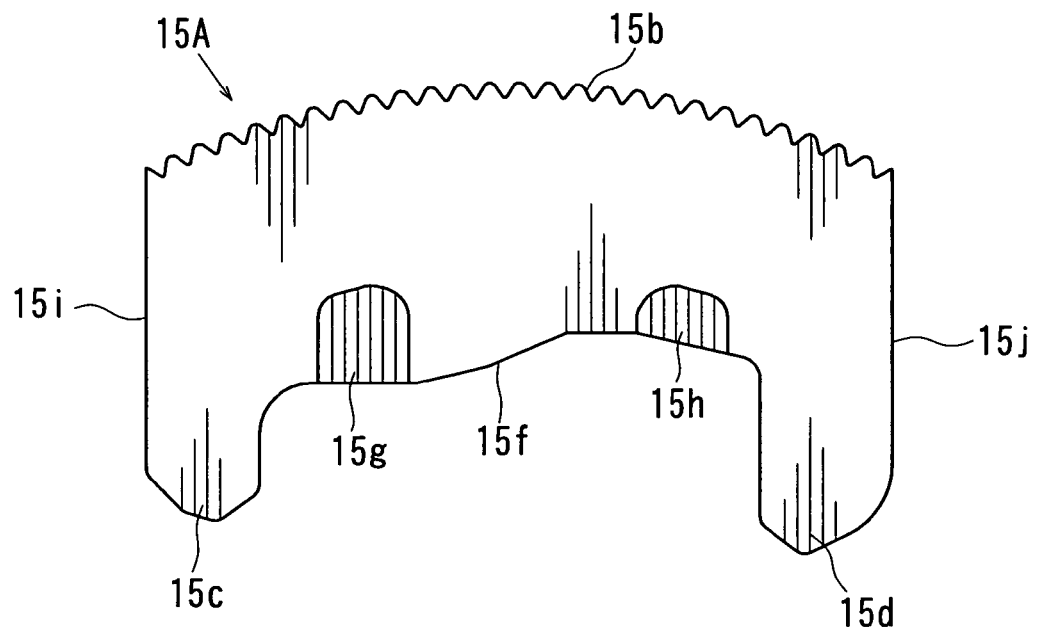
FIG. 5(A) is an enlarged plan view of a first type of slide pawl.
FIG. 5(B) is an enlarged plan view of a second type of slide pawl.
Figure 5:
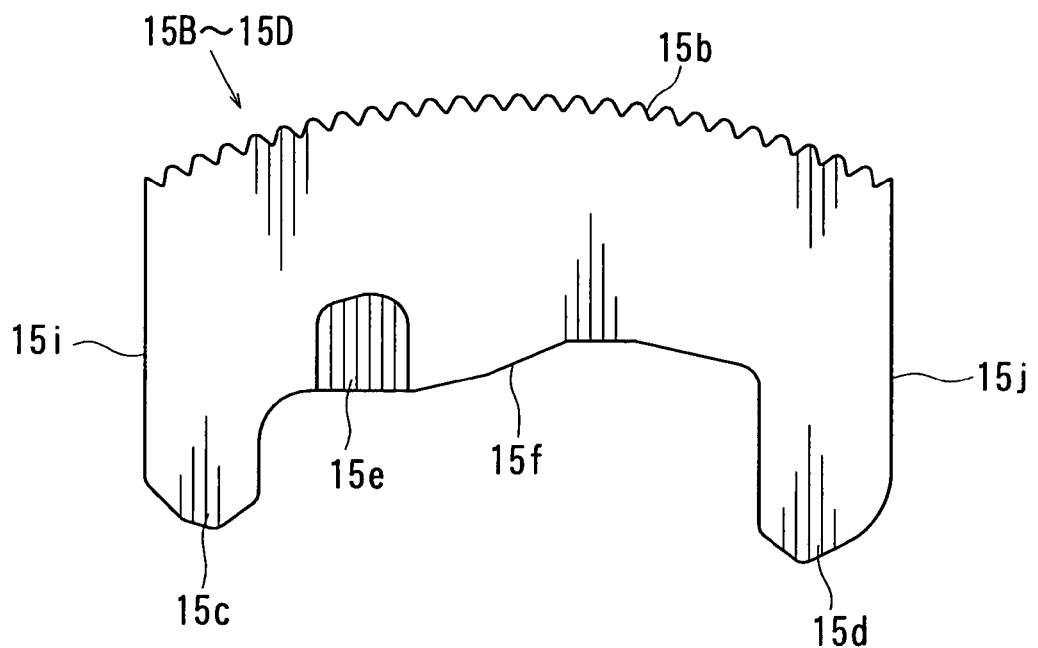

As best shown in FIG. 7, each of the torque receiving walls 31 of the torque receiving portions 30 (30a, 30b, 30c, 30d) is formed with a depressed portion 34 having a depth G so that a pair of separate contact projections or stress concentrating portions 33 are formed therein. Further, as shown in FIGS. 3 and 4, the torque receiving walls 31 of the torque receiving portions 30 are opposed to left and right side surfaces 15i and 15j of the slide pawls 15, thereby defining eight opposing regions or torque receiving regions therebetween. (The terms "right" and "left" are defined with reference to a radially outwardly directed direction.) For the purpose of convenience, the torque receiving regions that correspond to the left side surface 15i of the slide pawls 15 are referred to as first torque receiving regions 32a–32d. On the contrary, the torque receiving regions that correspond to the right side surface 15j of the slide pawls 15 are referred to as second torque receiving regions 32e–32h.

A representative process for manufacturing the seat reclining mechanism 10 will now be simply described. First, the slide pawls 15 (15A, 15B, 15C and 15D), the biasing spring 21, the operation arm 17 connected to the rotational rod 13, the rotary cam 16, and the active plate 18, are assembled into the first housing 11. On the other hand, the unlocking plate 19 is assembled into the second housing 12. The first and second housings 11 and 12 thus assembled are preferably coupled such that the peripheral edges 11a and 12a telescopically engage each other. Thereafter, the clip ring 22 is disposed on the engaged peripheral edges 11a and 12a of the housings 11 and 12. Finally, the clip ring 22 is fixed to the peripheral edge 11a of the first housing 11 by crimping, such that desired clearances are produced between the second housing peripheral edge 12a and the clip ring 22.

According to the seat reclining mechanism 10 thus constructed, the rotational shaft 13 is normally retained in the locking position by means of the biasing force of the biasing spring 21. When the shaft 13 is retained in the locking position, the rotary cam 16 is urged counterclockwise (FIG. 3), so that the cam mechanism of the rotary cam 16 is actuated. That is, the first to third cam surfaces 16c, 16b, and 16d, thereof cooperate with the corresponding cam contacts 15c, 15d and 15f of the slide pawls 15, so as to outwardly push the respective slide pawls 15. As a result, the slide pawls 15 are moved to an outermost position (FIG. 3). When the slide pawls 15 are retained in the outermost position, the convex toothed portions 15b of the pawls 15 engage the concave toothed portion 12c of the second housing 12. That is, when the rotary cam 16 is urged counterclockwise, the pawls 15 are positioned in engaging positions (FIG. 3). In this state, the second housing 12 is prevented from rotating relative to the first housing 11, thereby locking the seat reclining mechanism 10. As a result, the seat back S2 is locked in position relative to the seat cushion S1.

The rotational shaft 13 can be rotated clockwise against the urging force of the biasing spring 21 by operating the lever 14. When the rotational shaft 13 is rotated to an unlocking position (FIG. 4), the rotary cam 16 also is rotated clockwise to an unlocking position (FIG. 4), so that the first to third cam surfaces 16c, 16b, and 16d, thereof are disengaged from the cam contacts 15c, 15d, and 15f, of the slide pawls 15. Simultaneously, the active plate 18 also is rotated in the same direction as the rotary cam 16, so that the cam mechanism of the active plate 18 is actuated. As a result, the slide pawls 15 are inwardly moved, so that the convex toothed portions 15b of the pawls 15 are disengaged from the concave toothed portion 12c of the second housing 12. Consequently, the pawls 15 are positioned in non-engaging positions (FIG. 4). In this state, the second housing 12 can freely rotate relative to the first housing 11, thereby unlocking the seat reclining mechanism 10. As a result, the seat back S2 can freely rotate relative to the seat cushion S1, such that the seat back S2 can be tilted forwardly and rearwardly relative to the seat cushion S1.

Under an unlocking condition of the seat reclining mechanism 10, when the seat back S2 is tilted forwardly or folded relative to the seat cushion S1, the second housing 12 and the unlocking plate 19 are rotated counterclockwise in FIG. 4, so that the cam surface of the mid-section 19c-2 of the unlocking plate 19 sequentially engages the cam projections 15g and 15h of the special slide pawl 15A. As will be recognized, when the cam surface of the mid-section 19c-2 is engaged with either one of the cam projections 15g and 15h, the slide pawl 15A can be effectively retained in a non-engaging position even if the lever 14 is released. Therefore, the seat back S2 can be tilted forwardly, with the lever 14 released. When the seat back S2 is further tilted over a desired angle (e.g., when the seat back S2 is folded on the seat cushion S1 as shown by a broken line in FIG. 6), the cam surface of the mid-section 19c-2 of the plate 19 is disengaged from both of the cam projections 15g and 15h of the slide pawl 15A, so that the cam projections 15g and 15h fall within the second wide section 19c-3 of the cam slot 19c. As a result, the rotary cam 16 is immediately rotated counterclockwise to the locking position, so that the slide pawls 15 are outwardly moved toward the engaging positions. Consequently, the convex toothed portions 15b of the pawls 15 are engaged with the concave toothed portion 12c of the second housing 12, so that the seat reclining mechanism 10 is preferably locked.

Next, the function of the stress concentrating portions 33 of the torque receiving portions 30 (30a, 30b, 30c, 30d) will now be described in detail.

Figure 8:
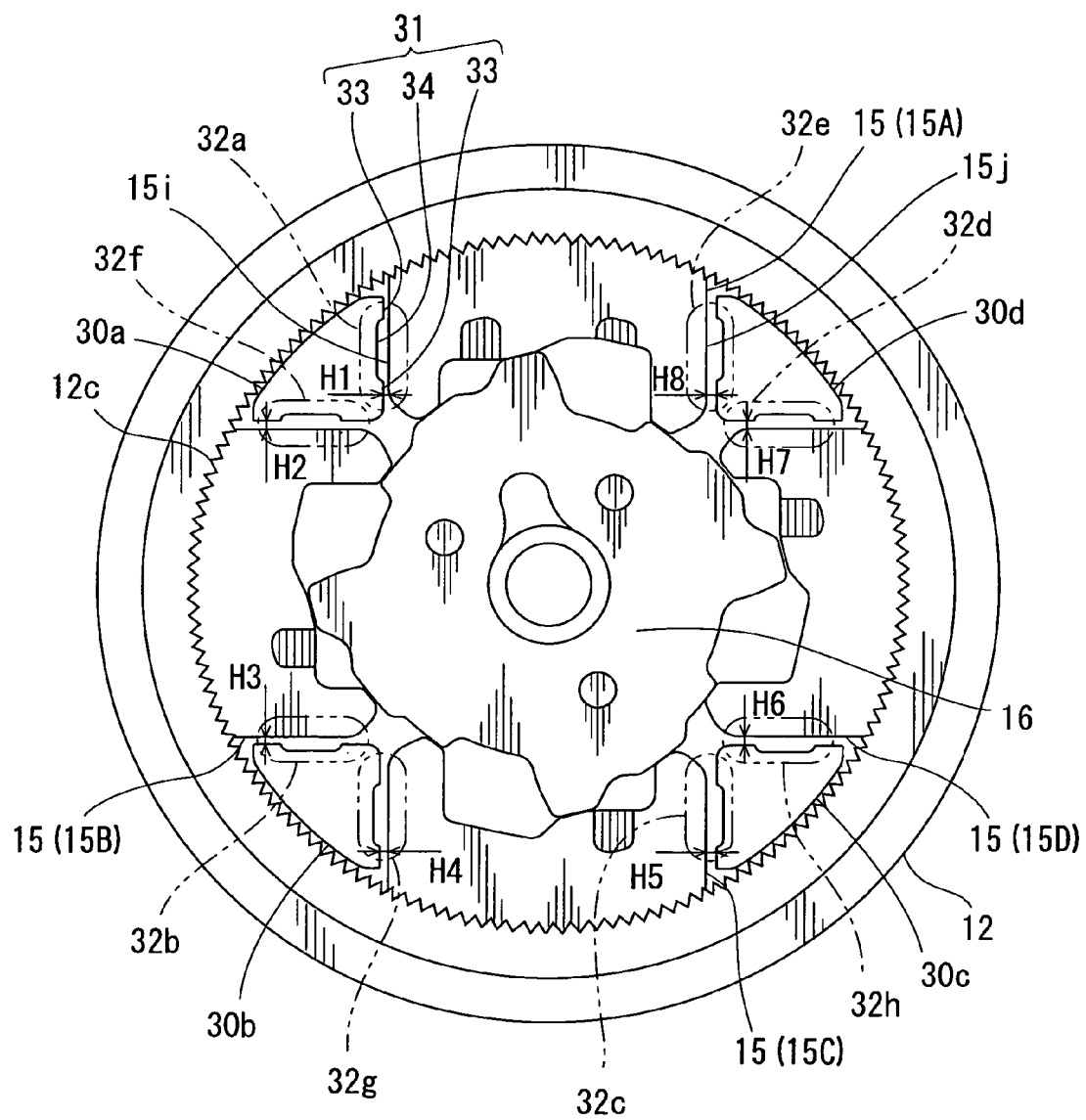
FIG. 8 is a plan view of the seat reclining mechanism, which illustrates the locking position of a rotational shaft of the seat reclining mechanism when no torque is exerted on the first housing, in which some components are omitted.

As shown in FIG. 8, when the seat back S2 is locked, if a substantial force is not applied to the seat reclining mechanism in a direction to forwardly tilt the seat back S2 relative to the seat cushion S1, no rotational moment or torque is exerted on the second housing 12. Therefore, the slide pawls 15 are not forced against the torque receiving walls 31 of the corresponding torque receiving portions 30. As a result, the left and right side surfaces 15i and 15j of the slide pawls 15 are separated from the torque receiving walls 31 of the torque receiving portions 30, thereby keeping clearances H1–H8 formed therebetween. As will be recognized, the clearances H1–H8 may inherently be produced in the manufacturing processes, due to machining errors or other such factors. Therefore, the clearances H1–H8 generally differ in width from each other. Further, the clearances H1, H3, H5 and H7 correspond to the first torque receiving regions 32a–32d. Also, the clearances H2, H4, H6 and H8 correspond to the second torque receiving regions 32e–32h.

Figure 9:
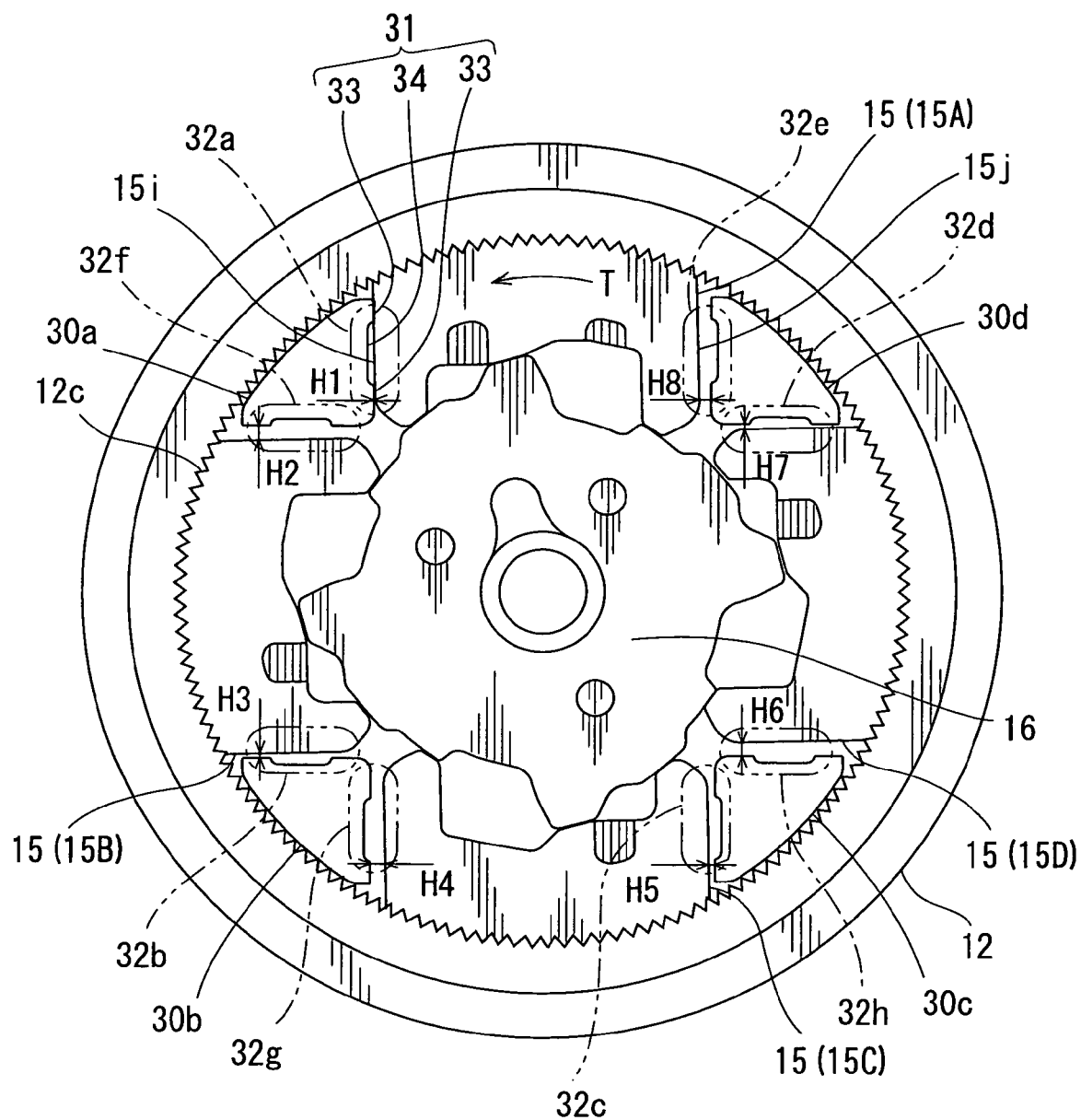
FIG. 9 is a plan view of the seat reclining mechanism, which illustrates the locking position of a rotational shaft of the seat reclining mechanism when a torque is exerted on the first housing, in which some components are omitted.

As shown in FIG. 9, when the seat back S2 is locked, if a force (small) is accidentally applied to the seat reclining mechanism in a direction to forwardly tilt the seat back S2 relative to the seat cushion S1, a rotational moment or torque T is generated and exerted on the second housing 12. As a result, the slide pawls 15 are forced counterclockwise against the torque receiving walls 31 of the corresponding torque receiving portions 30. However, all of the slide pawls 15 do not contact the torque receiving walls 31 of the corresponding torque receiving portions 30 because the clearances H1, H3, H5 and H7 are different in width from each other. That is, the torque T is not evenly received in all of the first torque receiving regions 32a–32d. Instead, only the left side surface 15i of the slide pawl 15A contacts the torque receiving wall 31 of the torque receiving portion 30a, if the clearance H1 is the smallest of the clearances H1, H3, H5 and H7 in width. As a result, the torque T is concentrated in and received only by the first torque receiving region 32a. However, the seat reclining mechanism 10 can withstand such a force because the force is small.

Figure 10:
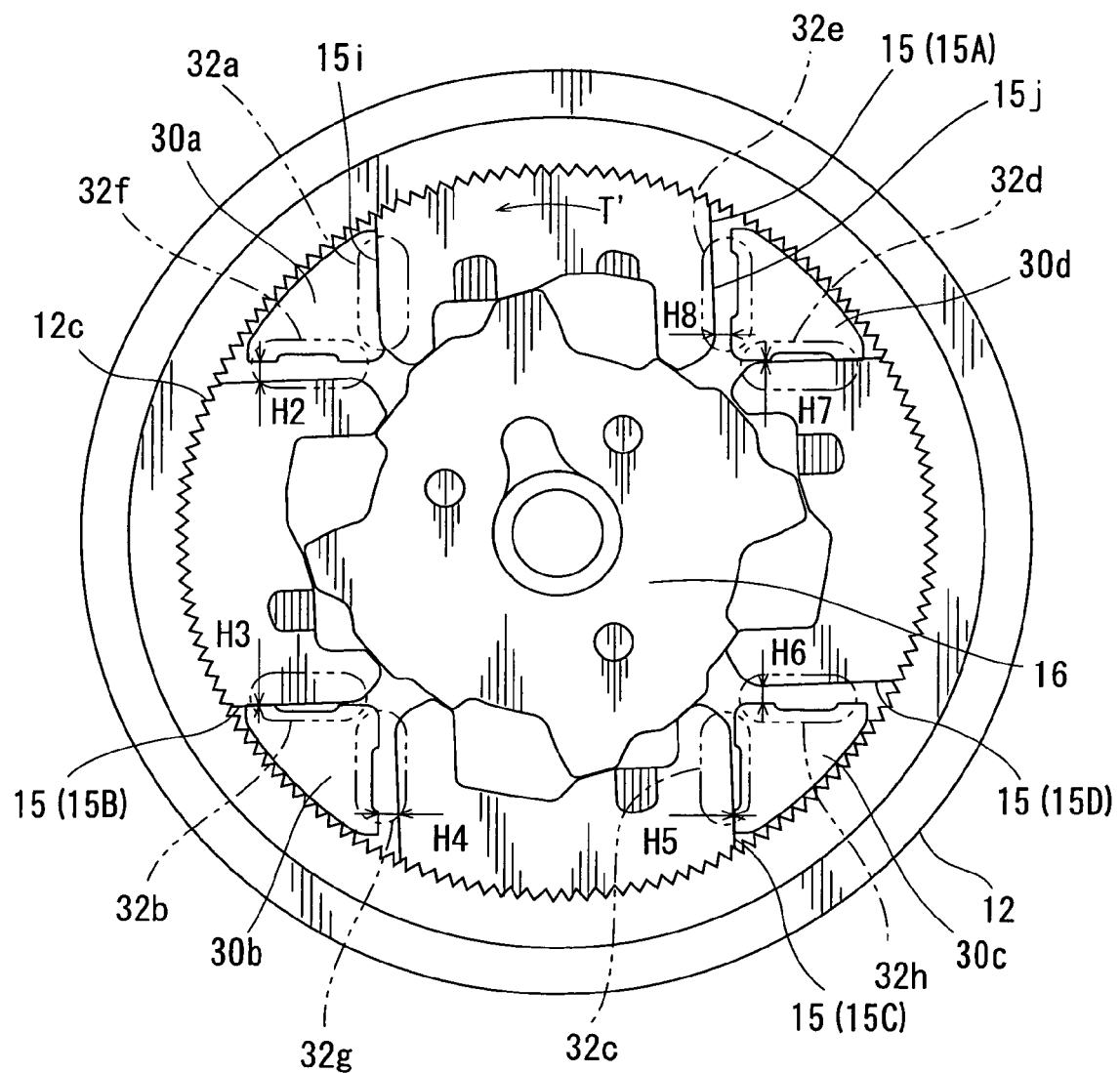
FIG. 10 is a view similar to FIG. 9, which illustrates the locking position of a rotational shaft of the seat reclining mechanism when a larger torque is exerted on the first housing.

As shown in FIG. 10, when the seat back S2 is locked, if a substantial force (large) is accidentally applied to the seat reclining mechanism in a direction to forwardly tilt the seat back S2 relative to the seat cushion S1, a large rotational moment or torque T' is generated and exerted counterclockwise on the second housing 12. As a result, the slide pawls 15 are forced counterclockwise against the torque receiving walls 31 of the corresponding torque receiving portions 30. Thus, the left side surface 15i of the slide pawl 15A contacts the torque receiving wall 31 of the torque receiving portion 30a, if the clearance H1 is the smallest of the clearances H1, H3, H5 and H7 in width. At this time, the large torque T' is concentrated in the stress concentrating portions 33 of the torque receiving wall 31 of the torque receiving portion 30a so that the stress concentrating portions 33 (i.e., the torque receiving wall 31) are effectively deformed and depressed over a desired distance. Correspondingly, the slide pawls 15 are further rotated counterclockwise as a result of the deformation of the stress concentrating portions 33 so that the left side surface 15i of the slide pawls 15B, 15C and 15D respectively contact the torque receiving walls 31 of the corresponding torque receiving portions 30b–30d. In other words, the clearances H1, H3, H5 and H7 are successively reduced to zero so that variations among the clearances H1, H3, H5 and H7 are eliminated or reduced. Consequently, the large torque T' is evenly received in all of the first torque receiving regions 32a–32d. Thus, the seat reclining mechanism 10 can reliably and stably withstand such a large force. Therefore, the seat back S2 is effectively prevented from being unlocked even if a large force is applied to the seat reclining mechanism 10.

Further, although not shown, when the seat back S2 is locked, if a substantial force (large) is applied to the seat reclining mechanism in a direction to rearwardly tilt the seat back S2 relative to the seat cushion S1, a large rotational moment or torque is exerted clockwise on the second housing 12. As a result, the slide pawls 15 are forced clockwise against the torque receiving walls 31 of the corresponding torque receiving portions 30. Thus, the right side surface 15j of the slide pawl 15B contacts the torque receiving wall 31 of the corresponding torque receiving portion 30a, if the clearance H2 is the smallest of the clearances H2, H4, H6 and H8 in width. At this time, the large torque is concentrated in the stress concentrating portions 33 of the torque receiving wall 31 of the torque receiving portion 30a so that the stress concentrating portions 33 are effectively deformed and depressed over a desired distance. Correspondingly, the slide pawls 15 are further rotated clockwise by the amount corresponding to the deformation of the stress concentrating portions 33 so that the right side surface 15j of the slide pawls 15C, 15D and 15A respectively contact the torque receiving walls 31 of the corresponding torque receiving portions 30b–30d. In other words, the clearances H2, H4, H6 and H8 are successively cleared or reduced to zero. Consequently, the large torque is evenly received in all of the second torque receiving regions 32e–32h.

As will be recognized, the depth G (FIG. 7) of the depressed portion 34 formed in the torque receiving walls 31 of the torque receiving portions 30 (i.e., the height of the stress concentrating portions 33) may preferably be determined so as to substantially correspond to the largest of the clearances H1–H8. If the depth G is substantially identical with the largest of the clearances H1–H8, the clearances H1–H8 can be effectively cleared or reduced to zero because the stress concentrating portions 33 can be easily deformed until the largest of the clearances H1–H8 is cleared.

SECOND DETAILED REPRESENTATIVE EMBODIMENT

Figure 11:
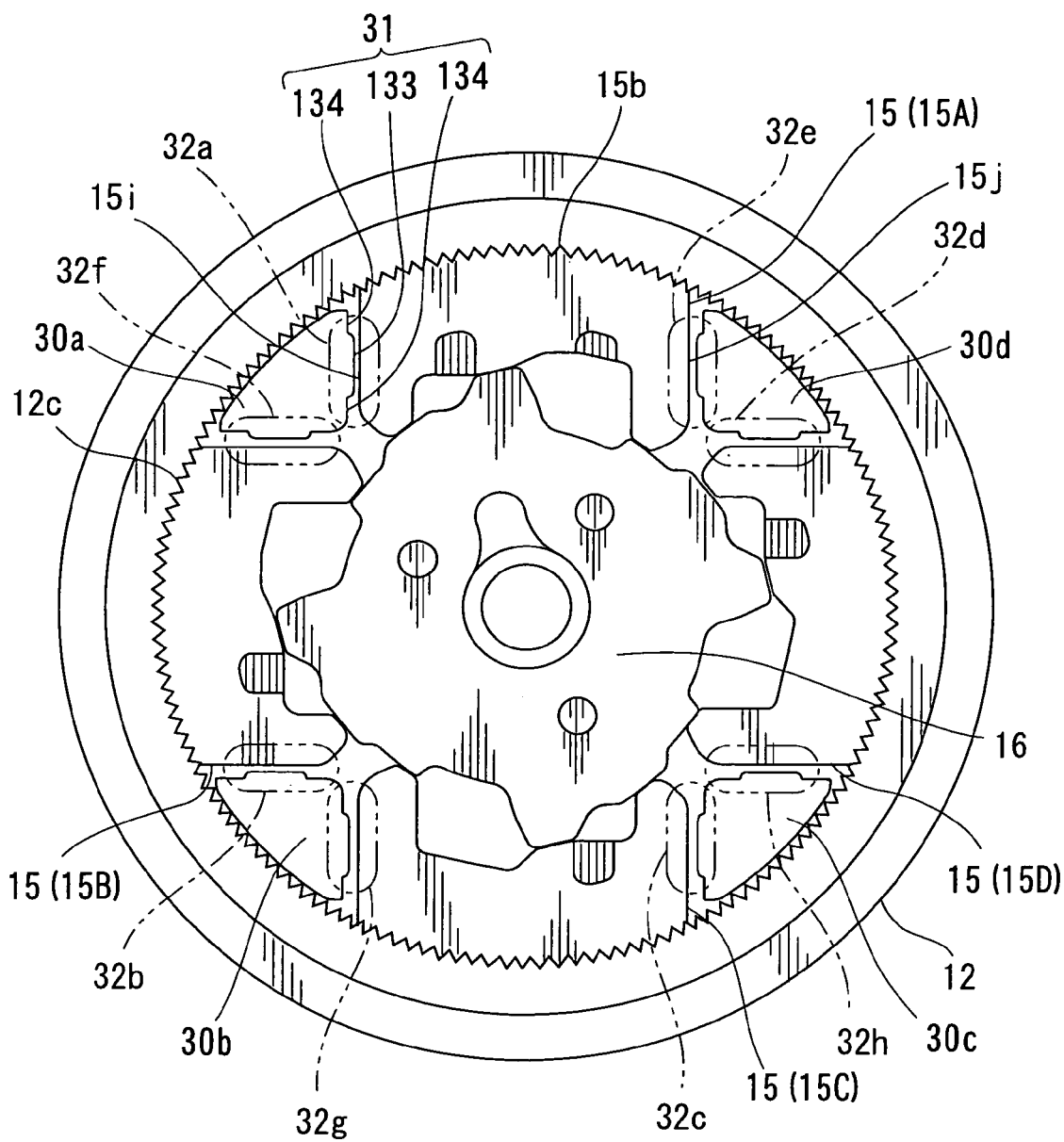
FIG. 11 is a view similar to FIG. 8, which illustrates a seat reclining mechanism according to a second embodiment of the present teachings, in which a modified guide portion is used.

The second detailed representative embodiment will now be described with reference to FIG. 11. Because the second embodiment relates to the first embodiment, only constructions and elements that are different from the first embodiment will be explained in detail. Elements that are the same in the first and second embodiments will be identified by the same reference numerals and detailed descriptions of such elements will be omitted.

In this embodiment, each of the torque receiving walls 31 of the torque receiving portions 30 (30a, 30b, 30c, 30d) is formed with a pair of depressed portions 134 so that a central contact projection or stress concentrating portion 133 are formed therein. The stress concentrating portions 133 thus constructed may substantially have the same function as the stress concentrating portions 33 in the first embodiment.

THIRD DETAILED REPRESENTATIVE EMBODIMENT

The third detailed representative embodiment will now be described with reference to FIG. 12. Because the third embodiment relates to the first embodiment, only constructions and elements that are different from the first embodiment will be explained in detail. Elements that are the same in the first and third embodiments will be identified by the same reference numerals and detailed descriptions of such elements will be omitted.

In this embodiment, as shown in FIG. 12, each of the torque receiving portions 30 (30a, 30b, 30c, 30d) is formed with a pair of removed portions 40a. Each of the removed portions 40a is formed along the peripheral edge 11a of the first housing by thinning or removing an outermost side of the torque receiving portion 30 toward the rotational axis L so as to preferably reduce the area of the torque receiving wall 31 without shortening the length L1 of the guide wall 41. In other words, the removed portions 40a are formed such that the arcuate guide groove 42 is broadened toward the rotational axis L at both ends. As the guide grooves 11c may be positioned more deeply in a direction of the rotational axis L than the arcuate guide groove 42, the removed portions 40a do not reduce the function of the guide wall 41 because the length L1 is not shortened.

Naturally, various changes and modifications may be made to the present teachings without departing from the scope of the invention. For example, although the stress concentrating portions 33 and 133 are formed in all of the torque receiving walls 31 of the torque receiving portions 30 (30a, 30b, 30c, 30d) in these embodiments, the stress concentrating portions 33 and 133 may preferably be formed in at least one of the torque receiving walls 31, if desired.

Although the stress concentrating portions 33 and 133 are formed in the torque receiving walls 31 of the torque receiving portions 30 (30a, 30b, 30c, 30d) in these embodiments, the stress concentrating portions 33 and 133 may preferably be formed in the left and right side surfaces 15i and 15j of the slide pawls 15, if desired. However, the stress concentrating portions 33 and 133 may typically be formed in the torque receiving walls 31 of the torque receiving portions 30 because the slide pawls 15 may generally be hardened or quenched.

Also, although the contact surfaces of the stress concentrating portions 33 and 133 are shaped as flat surfaces in these embodiments, such contact surfaces may be shaped as curved surfaces or conical surfaces. Also, the contact surfaces may be formed with a plurality of semispherical projections or other such projections.

Further, as will be appreciated, the number of the torque receiving portions 30 and the slide pawls 15 is not limited to four.

In addition, the stress concentrating portions 33 and 133 (the depressed portions 34 and 134) and the removed portions 40a can be formed in a casting process of the first housing 11 or formed by machining after completion of the casting process.

Next, the function of the stress concentrating portions 33 and the removed portions 40a will now be described in detail with reference to FIGS. 13 to 15.

Figure 13:
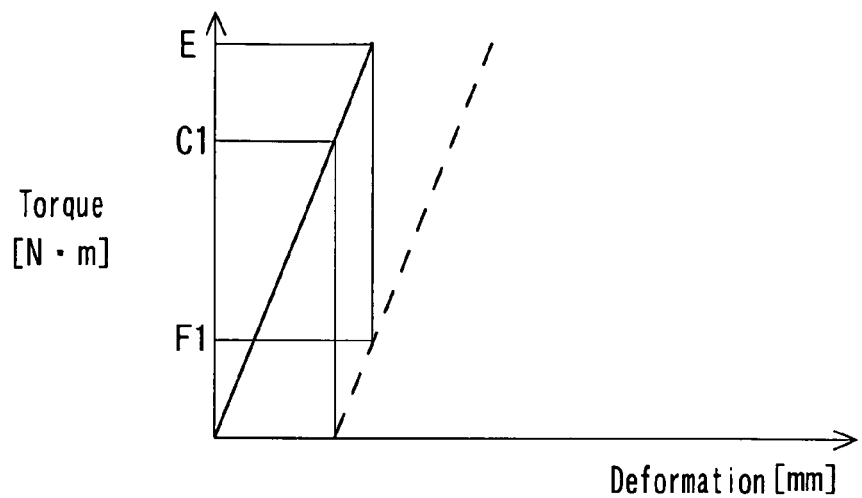
FIG. 13 is graphs illustrating relationship of torque versus deformation in a torque receiving wall of a conventional seat reclining mechanism.
Figure 14:
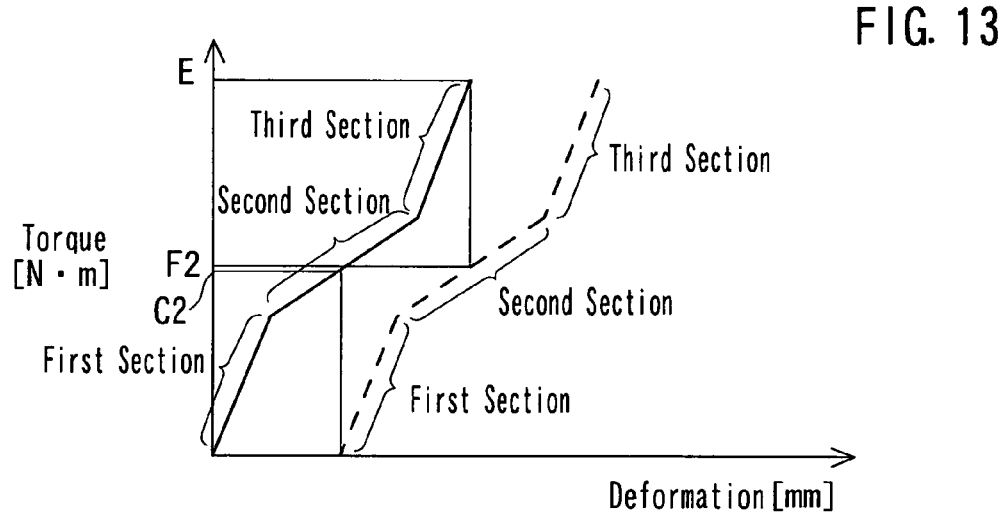
FIG. 14 is graphs illustrating relationship of torque versus deformation in a torque receiving wall in the seat reclining mechanism of the first embodiment.
Figure 15:
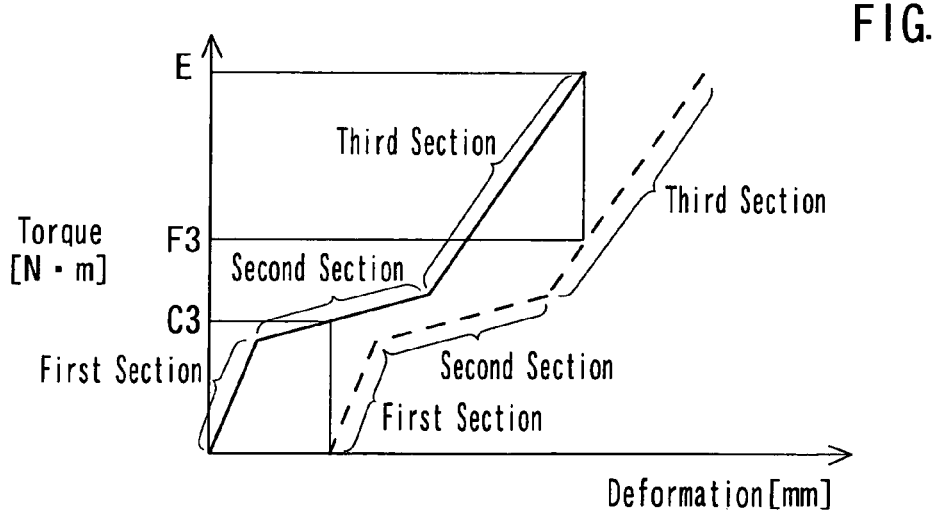
FIG. 15 is graphs illustrating relationship of torque versus deformation in a torque receiving wall in the seat reclining mechanism of the third embodiment.

FIGS. 13–15 are graphs (graphs of torque [N·m] versus deformation [mm] in the torque receiving wall) for illustrating function of the stress concentrating portions 33 and the removed portions 40a, which respectively correspond to following three different types of seat reclining mechanisms (Samples 1–3). Further, in each of FIGS. 13–15, the graph shown by a solid line is a graph that is obtained in the torque receiving region (i.e., 32a) corresponding to the smallest (i.e., H1) of the clearances H1–H8 formed between the slide pawls 15 and the torque receiving portions 30. Also, the graph shown by a dotted line is a graph that is obtained in each of the torque receiving regions (i.e., 32b–32d) corresponding to others (i.e., H3, H5 and H7) of the clearances H1–H8. As will be recognized, it is assumed in these graphs that the clearance H1 is the smallest clearance and the clearances H3, H5 and H7 are identical (H1<H3=H5=H7).

Sample 1: Seat reclining mechanisms in which no stress concentrating portions are formed in the torque receiving wall 31 (i.e., control)

Sample 2: Seat reclining mechanisms in which the stress concentrating portions 33 are formed in the torque receiving wall 31 (i.e., first embodiment)

Sample 3: Seat reclining mechanisms in which the stress concentrating portions 33 are formed in the torque receiving wall 31 and the removed portions 40a are formed in the torque receiving portions 30 (i.e., third embodiment)

With regard to Sample 1, when a force is applied to the seat reclining mechanism in a direction to forwardly tilt the seat back relative to the seat cushion, a corresponding rotational moment or torque is exerted counterclockwise on the second housing 12. As shown in FIG. 13, if the torque is less than a desired value C1, because the slide pawls 15B–15D do not contact the corresponding torque receiving portions 30b–30d, the torque may be concentrated in the torque receiving wall 31 of the torque receiving portion 30a so as to be received only by the torque receiving region 32a. However, when the torque is greater than the value C1, the torque may also be distributed to the torque receiving walls 31 of the remaining torque receiving portions 30b–30d because all of the slide pawls 15 contact the corresponding torque receiving portions 30a–30d. That is, when the torque exceeds the value C1, such a torque is received in all of the torque receiving regions 32a–32d.

As will be apparent from FIG. 13, when the torque is further increased so that a torque equivalent to a critical value E is exerted on the torque receiving wall 31 of the torque receiving portion 30a, a torque F1 is exerted on each torque receiving wall 31 of the remaining torque receiving portions 30b–30d. As will be easily appreciated, at this time, the total torque exerted on the second housing 12 is equivalent to [E+3×F1].

Further, the critical value E means a limit value that can be received by one of the torque receiving regions 32a–32d.

That is, if the torque exceeds the critical value E, the torque receiving portion 30 and the slide pawl 15 will be damaged. Therefore, the seat reclining mechanism of Sample 1 can withstand a force corresponding to a torque of up to [E+3×F1].

With regard to Sample 2, when a force is applied to the seat reclining mechanism in a direction to forwardly tilt the seat back relative to the seat cushion, a corresponding rotational moment or torque is exerted counterclockwise on the second housing 12. As shown in FIG. 14, if the torque is less than a desired value C2, because the slide pawls 15B–15D do not contact the corresponding torque receiving portions 30b–30d, the torque may be concentrated in the torque receiving wall 31 of a special torque receiving portion 30a so as to be received only by the torque receiving region 32a. However, when the torque exceeds the value C2, the torque may also be distributed to the torque receiving walls 31 of the remaining torque receiving portions 30b–30d because all of the slide pawls 15 contact the corresponding torque receiving portions 30. That is, when the torque exceeds the value C2, such a torque is received in all of the torque receiving regions 32a–32d.

As will be apparent from FIG. 14, when the torque is further increased so that a torque equivalent to the critical value E is exerted on the torque receiving wall 31 of the torque receiving portion 30a, a torque F2 is exerted on each torque receiving wall 31 of the remaining torque receiving portions 30b–30d. As will be easily appreciated, at this time, the total torque exerted on the second housing 2 is substantially equivalent to [E+3×F2]. Consequently, the seat reclining mechanism of Sample 2 can withstand a force corresponding to a torque of up to [E+3×F2].

Further, as shown in FIG. 14, each of the graphs includes first to third sections each having a different slope. As will be apparent, the second section has a more gentle slope than the first and third sections. This gentle slope of the second section may be caused by the deformation (i.e., deformation accompanied with buckling) of each of the stress concentrating portions 33 of the torque receiving walls 31.

With regard to Sample 3, when a force is applied to the seat reclining mechanism in a direction to forwardly tilt the seat back relative to the seat cushion, a corresponding rotational moment or torque is exerted counterclockwise on the second housing 12. As shown in FIG. 15, if the torque is less than a desired value C3, because the slide pawls 15B–15D do not contact the corresponding torque receiving portions 30b–30d, the torque may be concentrated on the torque receiving wall 31 of the special torque receiving portion 30a so as to be received only by the torque receiving region 32a. However, when the torque exceeds the value C3, the torque may also be distributed to the torque receiving walls 31 of the remaining torque receiving portions 30b–30d because all of the slide pawls 15 contact the corresponding torque receiving portions 30. That is, when the torque exceeds the value C3, such a torque is received in all of the torque receiving regions 32a–32d.

As will be apparent from FIG. 15, when the torque is further increased so that a torque equivalent to the critical value E is exerted on the torque receiving wall 31 of the special torque receiving portion 30a, a torque F3 is exerted on each torque receiving wall 31 of the remaining torque receiving portions 30b–30d. As will be easily appreciated, at this time, the total torque exerted on the second housing 2 is equivalent to [E+3×F3]. Consequently, the seat reclining mechanism of Sample 3 can withstand a force corresponding to a torque of up to [E+3×F3].

As shown in FIG. 15, similar to Sample 2, each of the graphs includes first to third sections each having a different slope. As will be apparent, the second section has a more gentle slope than the first and third sections. This gentle slope of the second section may be caused by the deformation (i.e., deformation accompanied with buckling) of each of the stress concentrating portions 33 of the torque receiving walls 31. As will be appreciated, the second section is more gentle than the second section in Sample 2 because the stress concentrating portions 33 in Sample 3 are more deformable than those in Sample 2 due to the existence of the removed portions 40a.

As previously described, the removed portions 40a are formed in the outermost side of the torque receiving portion 30. Therefore, the stress concentrating portions 33 can be easily and reliably deformed because the torque may be radially outwardly concentrated when the second housing 12 rotates relative to the first housing 11. As a result, the variations among the clearances may be rapidly eliminated.

As will be apparent from FIGS. 13, 14, and 15, the following relation holds:

$$C1>C2>C3$$

This means that in the seat reclining mechanisms of the present inventions, the torque that is exerted on the second housing may preferably be distributed to the torque receiving walls 31 of all of the torque receiving portions 30, even if the torque is small. As a result, the seat reclining mechanisms of the present inventions can more reliably and stably withstand the force applied thereto than the conventional seat reclining mechanisms.

In addition, as will be apparent from FIGS. 13, 14, and 15, the following relation also holds:

$$F3>F2>F1 \text{ (i.e., } E+3\times F3>E+3\times F2>E+3\times F1)$$

This means that the seat reclining mechanisms of the present inventions may substantially withstand a larger force than the conventional seat reclining mechanisms.

Further, it is understood that although each of the graphs of FIGS. 14 and 15 is shown as a polygonal line (i.e., a strictly sectionalized line) for explanatory purposes, such a graph will actually be a curved line that is not clearly sectionalized.

In addition, if the deformation of the stress concentrating portions of the torque receiving walls is not accompanied with buckling in the second section, the first and second sections will be depicted by the same slope.

The invention claim is:

1. A seat reclining mechanism for a vehicle seat, comprising:
    a plurality of slide pawls each having an outward toothed portion and a side surface,
    a ratchet having an inward circular toothed portion,
    a holder having a plurality of guide portions each of which is formed with a torque receiving portion, the guide portions slidably receiving the slide pawls so that the slide pawls can be moved toward and away from the inward toothed portion of the ratchet, the torque receiving portion having a torque receiving wall that is opposed to the side surface of the slide pawls,
    a cam member pushing the slide pawls toward the inward toothed portion of the ratchet,
    at least one contact projection formed in the torque receiving wall of the torque receiving portion and projecting toward the slide pawl side surface,
    wherein the ratchet and the holder are prevented from rotating relative to each other when the outward toothed portions of the pawls engage the inward toothed portion of the ratchet, wherein the ratchet and the holder can rotate relative to each other when the outward toothed portions of the pawls are disengaged from the inward toothed portion of the ratchet, and wherein the contact projection is arranged and constructed so as to be deformed to eliminate variations among clearances formed between the slide pawls and the torque receiving portions when a torque is exerted between the ratchet and the holder, so that the ratchet and the holder rotate relative to each other by an amount corresponding to the deformation of the contact projection.

2. A seat reclining mechanism as defined in claim 1, wherein the torque receiving portion has a removed portion that is formed along a peripheral edge of the holder.

3. A seat reclining mechanism as defined in claim 2, wherein the torque receiving portion has an arcuate wall so that an arcuate guide groove is defined between the arcuate wall and the peripheral edge of the holder, wherein the guide portions define four radially extending guide grooves therebetween so that the slide pawls are slidably received therein, and wherein the removed portion is formed such that the arcuate guide groove is broadened toward a rotational axis of the ratchet.

4. A seat reclining mechanism as defined in claim 2, wherein each of the guide portions has a guide wall, and wherein the torque receiving portion is removed such that a length of the guide wall is not reduced.

5. A seat reclining mechanism as defined in claim 1, wherein the at least one contact projection comprises two contact projections, and wherein the two contact projections are established by a depressed portion formed in the torque receiving wall.

6. A seat reclining mechanism as defined in claim 1, wherein the torque receiving portion has a removed portion that is formed by thinning an outermost side of the torque receiving portion toward a rotational axis of the ratchet.

\* \* \* \* \*